Feb. 21, 1939.  R. G. WYLD  2,148,388
FAN DISCHARGE CASING
Filed Feb. 27, 1937  2 Sheets-Sheet 2
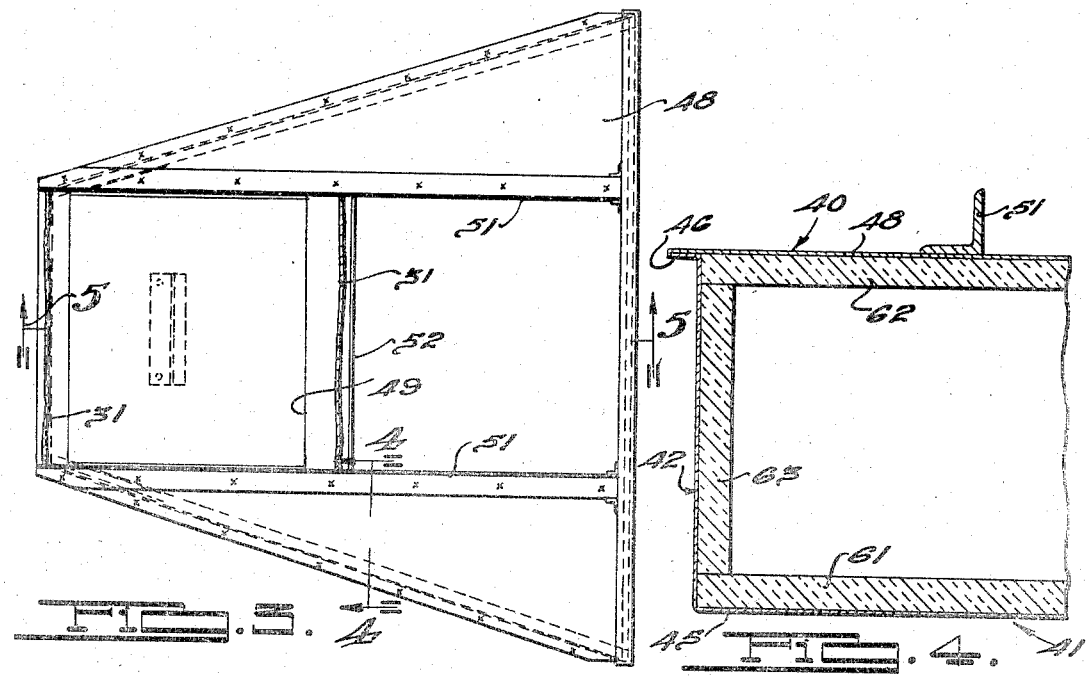
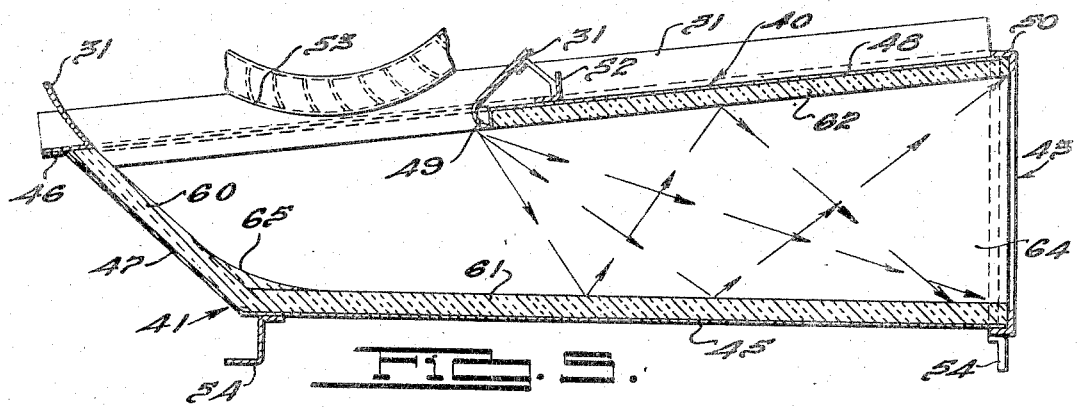
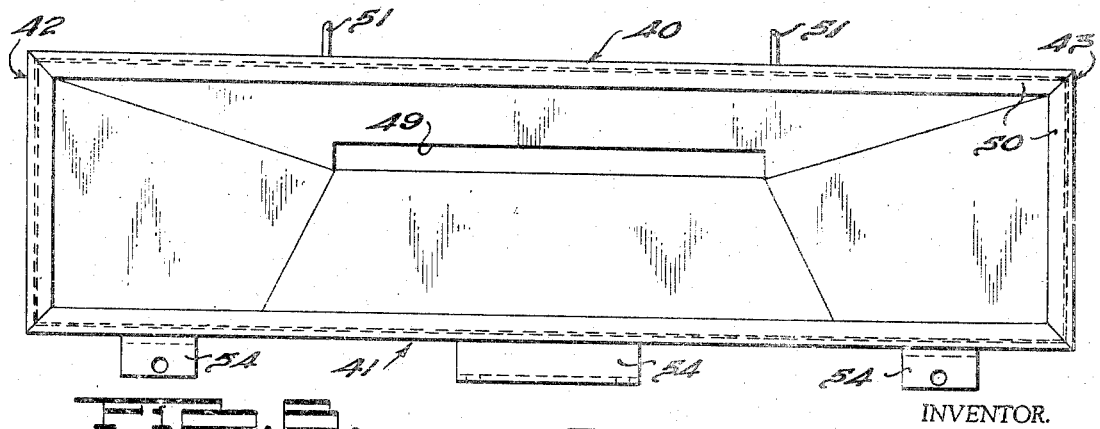
INVENTOR.
REGINALD G. WYLD
BY
ATTORNEY.

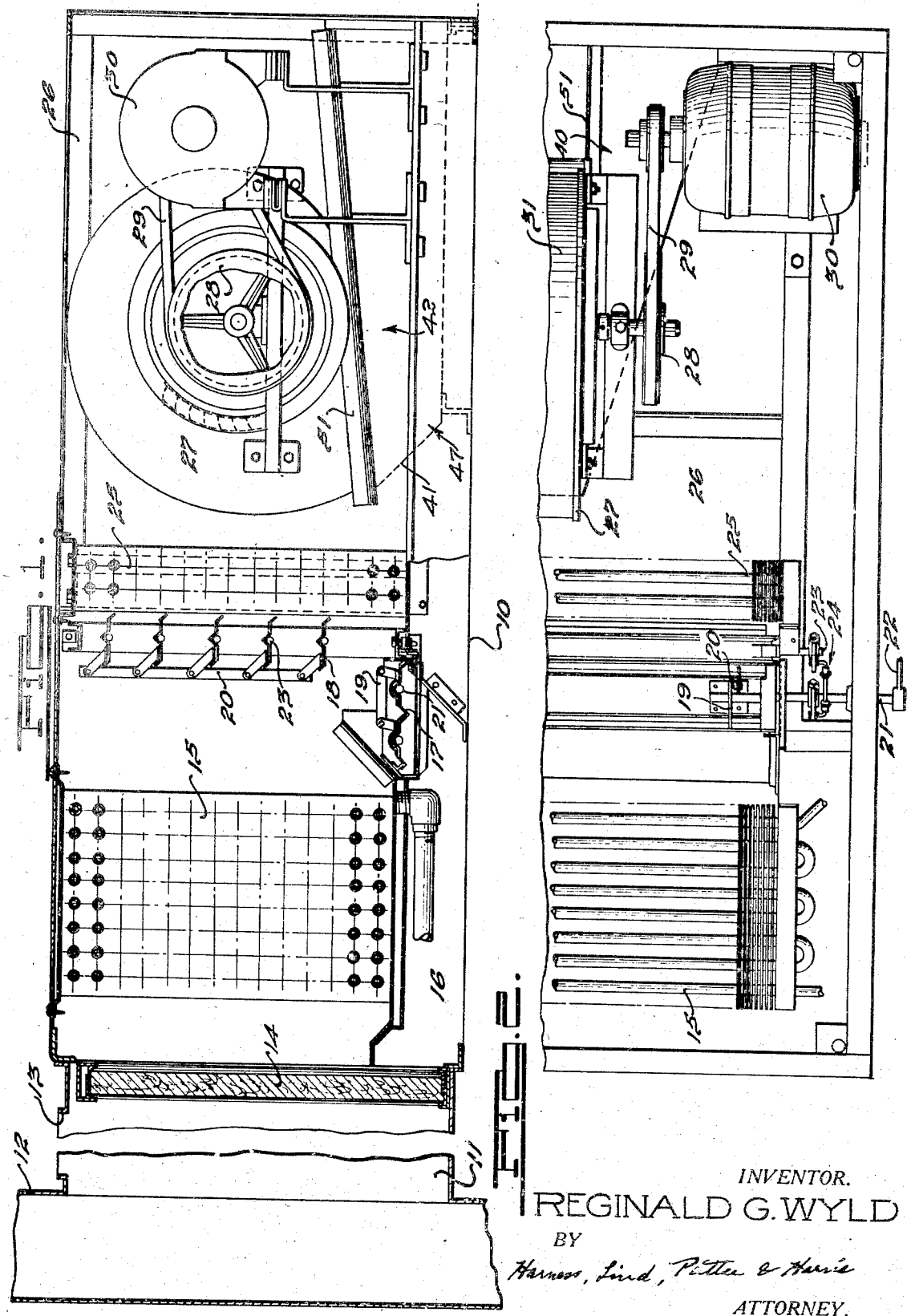

Patented Feb. 21, 1939

2,148,388

UNITED STATES PATENT OFFICE 2,148,388

FAN DISCHARGE CASING

Reginald G. Wyld, Dayton, Ohio, assignor, by mesne assignments, to Chrysler Corporation, Highland Park, Mich., a corporation of Delaware Application February 27, 1937, Serial No. 128,236

4 Claims. (Cl. 230—233)

The present invention relates to a blower and discharge casing therefore of particular utility in air conditioning apparatus where uniform distribution of output and silent operation are desirable. The invention is particularly designed for use in connection with apparatus for cooling and dehumidifying air for human habitations, but may be used in the same or other apparatus for propelling air which has been heated or humidified, or both, or put to any use requiring an even flow of air from an impeller.

An object of the invention is to provide apparatus for projecting the air therefrom in a stream having substantially uniform velocity and density throughout its cross-sectional area, having substantially the same volume of air passing through each unit of cross-sectional area per unit of time. A result of using the apparatus is the creation of an air stream free from turbulence and cross-currents, which stream can be projected a long distance across a room or other enclosure, or which will travel through a long register conduit with the least possible loss of head.

A further object of the invention is to provide apparatus for obtaining the foregoing results while eliminating noises created by the blower, without the use of baffles or other devices which would reduce the effective head of the air stream. The apparatus is so constructed that the air is forced to travel in substantially straight paths while sound waves created by the blower are directed across the path of the air to be absorbed by the walls of the discharge casing. For this purpose, the walls of the discharge casing are formed so as to provide a discharge conduit progressively increasing in cross-sectional area at a slightly greater rate than that of the space between the periphery of an impeller wheel and its housing, the conduit preferably being rectangular in cross-section with its sides set at small angles within critical limits and lined with sound-absorbing material, the length of the casing with respect to the blower outlet being such that practically all sound waves which are not fully absorbed at one side of the conduit are reflected against another side to be absorbed thereby.

A further object of the invention is to devise a blower and discharge casing which can be manufactured as a standard unit to be applied to various types of air conditioners, such as vertical, horizontal or suspended types, while achieving the foregoing objects, which unit will be economical of both materials and space.

These and other objects and advantages of the invention will be apparent from a study of the following specification, taken in connection with the accompanying drawings wherein like numerals refer to like parts throughout.

In the drawings:

Figure 1 is a vertical section taken along one side of an air conditioner in which the present invention is incorporated;

Figure 2 is a partial plan view of the mechanism of Figure 1;

Figure 3 is a plan view of the discharge casing of the present invention;

Figure 4 is an enlarged partial section of the discharge casing, taken along line 4—4 of Figure 3;

Figure 5 is an enlarged longitudinal section of the discharge casing, taken along line 5—5 of Figure 3; and Figure 6 is an enlarged front view of the discharge casing, looking into the same.

The air conditioner shown in Figures 1 and 2 is of a type designed to be suspended from the ceiling of an enclosure and embodies means to filter, cool and dehumidify, and reheat a mixture of outside and recirculated air. It is to be appreciated that the invention is not limited to use in such a type of conditioner but may be installed in any apparatus requiring the moving of air or other gases. The conditioner comprises a casing 10 connected to a chamber 11 in which outside air entering through conduit 12 is mixed with recirculated air entering through opening 13, the mixed air being drawn through a filter 14 into the casing. All of the air may pass through cooling and dehumidifying coils 15, or through a by-pass 16, or the air may be proportionately divided therebetween in accordance with the positions of dampers 17 and 18. There are two dampers 17 illustrated, connected together by a link 19 and a plurality of dampers 18 connected together by a link 20. Dampers 17 are actuated by a shaft 21 having a crank 22, by means of which the shaft may be manually or automatically rocked. Shaft 21 is connected to shaft 23 of dampers 18 by a linkage 24 so that as one set of dampers opens the other closes, and vice versa. The dampers 17 are designed completely to block by-pass 16 when closed but the dampers 18 never completely shut off the flow of air therethrough so that when air is flowing through the by-pass it will be frictionally opposed by the dampers 18 in order that the load on the blower may remain fairly constant. The air then passes through a coil 25 which may be heated by a circulating heating medium if desired.

The air in the conditioned air chamber 26 is drawn into the suction inlet at the center of a wheel type blower 27 of ordinary construction driven by a pulley 28, belt 29 and motor 30. The blower housing comprises the usual side walls having central suction inlets and an outer wall 31 spirally positioned to provide a substantially uniformly increasing space between the periphery of the wheel and the said walls. A feature of this invention is to so terminate the side walls and the discharge end of the outer wall as to provide a discharge outlet lying in a plane substantially tangential to the periphery of the blower wheel.

Figures 3 to 6 inclusive disclose the preferred embodiment of the discharge casing by means of which the air propelled by the blower is silenced and caused to flow in a stream of uniform density and velocity, free from turbulence and cross-currents which would reduce the effective head of the stream. The casing comprises a side 40 lying in the plane of the discharge outlet and hence substantially tangential to the periphery of the blower wheel. The opposite side 41 commences as a continuation of the spiral of the outer wall 31 at the discharge outlet until sufficient depth has been reached and then continues as a plane surface set at a diverging angle with respect to the side 40. The other two sides, 42 and 43, which complete the casing, diverge from the end of the wall 31 to form a conduit rectangular in cross-section and progressively increasing in cross-sectional area at a slightly greater rate than that of the space between the blower wheel and blower housing.

The discharge casing is preferably made by bending a sheet of rolled metal to form a trough-shaped member 45, having flanges 46 and an inclined rear portion formed by cutting the sheet and overlapping the edges of the central and side portions of the trough as at 47. The fourth side of the casing is formed by a sheet of rolled metal 48 spot-welded to flanges 46 and provided with an opening 49. Angles 50, spot-welded to the sheet metal, form a stiffening flange at the outlet of the casing, while other angles 51 and 52 are spot-welded to sheet 48 as braces. The flanges of angles 51 are recessed at 53 to provide a saddle for the blower housing which is preferably welded to the casing. Legs 54 are provided with which to attach the blower assembly to the frame of the air conditioning unit. A lining of sound-absorbing material is then applied, preferably in the form of fitted boards of a thickness such as to cover the flanges of angles 50 and other protruding parts. A piece 60 is first placed against the rear of the casing, piece 61 is then positioned against side 41, and piece 62 is held in position against side 40 while pieces 63 and 64 are fitted against sides 42 and 43, respectively, to lock the other pieces against the metal sides. A fillet 65 of sound-absorbing material may, if desired, be placed at the angle between pieces 60 and 61 further to reduce the likelihood of disturbing the air stream.

A great problem with blowers for use in air conditioning has been to create an outlet conduit such that the air will flow uniformly therethrough without loss of head due to turbulence and cross-currents. The discharge casing of the present invention is designed to emit air uniformly into an enclosure or a conduit to which angles 50 may be attached. It is a feature of the present invention that the angular relations of the sides of the casing are set within critical limits so as to eliminate the greatest amount of noise while permitting smooth air flow. To this end the sides, 42 and 43 are set at an angle within the range of fifteen to twenty degrees with respect to the centerline of the casing, while the plane surface of side 41 is set at an angle within the range of five to ten degrees with respect to side 40. In the preferred embodiment illustrated in Figures 3 to 6, the first angle is approximately seventeen degrees while the latter angle is approximately seven degrees. This relationship provides a conduit of rectangular cross-section progressively increasing in cross-sectional area at a greater rate than that of the space surrounding the blower wheel within the blower housing, which relationship permits the most even transition of static pressure within the blower to kinetic pressure of the air stream.

The elimination of most of the noises originated by the blower is assured by the present construction. Any sound waves passing through opening 49 are either absorbed by the acoustic material on side 41, or are reflected back and forth within the casing until fully absorbed. It is appreciated that the humidity and temperature of the air affect the speed of sound, but within such small limits that it is safe to assume that the velocity of sound in the air being propelled through the casing is usually from 1100 to 1150 feet per second. Air conditioning usually demands an air velocity of approximately 20 feet per second or less. In accordance with well known laws the sound waves may be deflected slightly, but the amount of deflection is not very great due to the low ratio of the velocity of the air to the speed of sound in the air. The design of the casing is such that, considering the worst possible condition, even those waves originating at or near the lower limits of the blower wheel are directed to impinge against side 41 (as shown in Figure 5 by means of the directional arrows), substantially all of the waves are directed at such an angle as to be reflected against and more fully absorbed by other sides such as side 40, and by far the great majority of the waves are reflected more than twice until fully absorbed. To this end the length of the conduit formed by the discharge casing is preferably such, with respect to the length of the opening 49, as to have substantially all sound waves originating with the blower wheel impinge against at least the side 41.

Having fully described the preferred form of the invention, it will be apparent to those skilled in the art that alterations and modifications in arrangement and details may be devised within the purview of the invention. All such as come within the scope of the following claims are to be considered as a part of the present invention as contemplated by the statutes now in force.

I claim:

1. A discharge casing for a wheel type blower having an impeller wheel, a housing including a spiral outer wall adjacent to the periphery of the wheel, and a discharge outlet lying in a plane approximately tangential to the periphery of the wheel, said casing including a side lying in the plane of said discharge outlet and an opposed side beginning substantially as a continuation of the spiral of said outer wall and extending as a plane surface, diverging from the first side at an acute angle with respect thereto, and two other sides, the last two sides being divergently disposed so as to form a rectangular conduit progressively increasing in cross-sectional area at a greater rate than that of the space between the periphery of said wheel and said housing, the length of said discharge casing with respect to the length of said discharge outlet being such that substantially all atmospheric vibrations within the sonic range originated by said impeller wheel impinge upon a side of the casing.

2. A discharge casing for a wheel type blower having an impeller wheel, a housing including a spiral outer wall adjacent to the periphery of the wheel, and a discharge outlet lying in a plane approximately tangential to the periphery of the wheel, said casing including a side lying in the plane of said discharge outlet, an opposed side beginning substantially as a continuation of the spiral of said outer wall and extending as a plane surface diverging from the first side at an acute angle with respect thereto, and two other sides, the last two sides being divergently disposed so as to form a rectangular conduit progressively increasing in cross-sectional area at a greater rate than that of the space between the periphery of said wheel and said housing, the length of said discharge casing with respect to the length of said discharge outlet being such that substantially all atmospheric vibrations within the sonic range originated by said impeller wheel impinge upon a side of the casing at such angles that the majority of such vibrations may be reflected against another side of the casing.

3. A discharge casing for a wheel type blower having an impeller wheel, a housing including a spiral outer wall adjacent to the periphery of the wheel, and a discharge outlet lying in a plane approximately tangential to the periphery of the wheel, said casing including a side lying in the plane of said discharge outlet, an opposed side beginning substantially as a continuation of the spiral of said outer wall end extending as a plane surface diverging from the first side at an acute angle with respect thereto, two other sides, the last two sides being divergently disposed so as to form a rectangular conduit progressively increasing in cross-sectional area at a greater rate than that of the space between the periphery of said wheel and said housing, the length of said discharge casing with respect to the length of said discharge outlet being such that substantially all atmospheric vibrations within the sonic range originated by said impeller wheel impinge upon a side of the casing, and sound-absorbing material forming at least the inner surfaces of said sides.

4. A discharge casing for a wheel type blower having an impeller wheel, a housing including a spiral outer wall adjacent to the periphery of the wheel, and a discharge outlet lying in a plane approximately tangential to the periphery of the wheel, said casing including a side lying in the plane of said discharge outlet and an opposed side beginning substantially as a continuation of the spiral of said outer wall and extending as a plane surface diverging from the first side at an acute angle with respect thereto, two other sides, the last two sides being divergently disposed so as to form a rectangular conduit progressively increasing in cross-sectional area at a greater rate than that of the space between the periphery of said wheel and said outer wall, the length of said discharge casing with respect to the length of said discharge outlet being such that substantially all atmospheric vibrations within the sonic range originated by said impeller wheel impinge upon a side of the casing at such angles that the majority of such vibrations may be reflected against another side of the casing, and sound-absorbing material forming at least the inner surface of said sides.

REGINALD G. WYLD.